Patented Feb. 2, 1932

1,843,783

UNITED STATES PATENT OFFICE

AUGUST REGAL, OF BRNO, CZECHOSLOVAKIA

PROCESS FOR THE IMPREGNATION OR INCRUSTATION OF HYDROLYZED FIBROUS MATERIALS

No Drawing.   Application filed October 11, 1929.   Serial No. 399,103.

My invention has reference to the treatment of hydro-cellulose fibers and consists in a process for incrustating or impregnating such fibers.

As is known, the conversion of cellulose into hydro-cellulose occurs through a chemical process, in which the cellulose (which consists of carbon, hydrogen and oxygen and has the formula $C_{12}H_{20}O_{10}$) by treatment with sulfuric acid, mixtures of sulfuric acid and hydro-chloric acid, mixtures of sulfuric acid with nitric acid, mixtures of nitric acid with hydro-chloric acid, or nitric acid alone, acetic acid, acid salts, dissociated salts and zinc chloride solutions, etc.,—absorbs water whereupon it has a composition according to formula $C_{12}H_{22}O_{11}$.

The sheets or webs made from hydro-cellulose fibers are sold in the market under the name of imitation parchment or vulcan fiber.

A bad characteristic of these products is that they easily absorb moisture which makes their use difficult for many purposes. To make them water-proof and flexible, various processes are known, among them the process described in British Patents Nos. 110,318 and 110,650. The process consists in this that the fiber which still contains the vulcanizing or parchmentizing liquid, is treated with a second liquid which displaces the first liquid, whereupon the treatment is continued with a substance which is soluble in this second liquid and is suitable for making the fiber more water-proof or more flexible. In accordance with the process of the aforementioned patents, the substance used for the displacement of the vulcanizing or parchmentizing liquid to make the fiber water-proof, is alcohol, acetone, ether, and among other substances also phenol-formaldehyde-condensation products. If the process is practised with a phenol-formaldehyde-condensation product, the fiber treated is subsequently heated in order to convert the condensation product into a solid state.

The Patent No. 1,616,062 also describes a water-proofing process of products made from vulcanized or parchmentized fibers, by means of phenol-furfurol condensation products. The process itself, however, differs from the aforementioned processes having the characteristic feature that the fibers intended for vulcanization or parchmentization, or products made therefrom, such as paper, have been impregnated, prior to the vulcanizing or parchmentizing step, with artificial resin.

The present process differs from the above mentioned water-proofing processes for vulcan fiber and imitation parchment, and the vulcanized or parchmentized fibrous materials and is characterized by this that the agents present in excess and effecting the hydrolysis of the fibrous materials, such as sulfuric acid, zinc chloride, etc., while the vulcanizing or parchmentizing process is still in progress, cause the separation of the artificial resin from the resin solutions so that in this way the already hydrolyzed fibrous materials or those fibrous materials which are still in the process of hydrolysis, become impregnated or incrusted with artificial resin.

If, for instance, it is desired to impregnate or incrustate fibers which are hydrolyzed by sulfuric acid and while these are still in the stage of hydrolysis, then soap solutions of resins (i. e. an alkaline solution) are added during this chemical process. The sulfuric acid neutralizes the alkalis of the resin-soap solutions and the precipitating resins are deposited on the already formed hydro-cellulose. As the parchmentizing can be carried out with stronger or weaker acids, the neutralization of the alkalis from the soap solutions shall only take place, when the concentration of the acid is of such a degree that it is capable of bringing about a complete neutralization.

In the event that the parchmentizing of the fibrous material takes place in stages, progressing from weaker to stronger acids, and if the concentration of the acid in the last stage of the parchmentizing process should be stronger than is necessary for the neutralization of the alkalis, it must be diluted because otherwise, by the action of strong acids, the physical properties of the resins, e. g. fusibility and solubility are affected thereby.

Should the excess acid used during the parchmentizing operation be too weak, it must be strengthened sufficiently so as to neutralize the alkalis. Because of the gelatinous character of the hydro-cellulose the adhesion of the resin to the fiber is promoted. The chemical process can be explained in this way that whn artificial resins are treated with alkalis, e. g. soda lye, resin-soaps are formed, water being separated. By the action of hydro-chloric acid or sulfuric acid, the corresponding alkali salts are formed and the resin is liberated. The same process takes place, if the parchmentizing operation has been effected with acid salts.

When the fibrous material is vulcanized with zinc chloride, one proceeds with respect to the impregnation or incrustation of the vulcanized fiber in exactly the same manner as stated in the foregoing example. But, the chemical process is such, that during the neutralizing of the alkalis zincates are formed from the resin-soap solutions, while hydro-chloric acid is liberated. Should the same not be sufficient for neutralizing the resin-alkali solution, then by the addition of more acid complete neutralization can be effected. The salts formed the neutralization are removed in any suitable manner.

The different kinds of imitation parchment are prepared today by different processes and with highly developed technical apparatus. Generally, the process is about as follows:

The paper carried on rollers and intended for parchmentizing, passes through a glass or lead tank, around a glass or lead roll through the acid, then passes through a pair of rollers exerting a slight pressure to squeeze out the greater surplus of the acid. Thereupon, the paper web is led through several tanks filled with water. After complete washing out and subsequent neutralization of the acid, the paper web, for the purpose of complete dehydration, is passed over felt rollers and for the purpose of drying, over steam-heated cylinders.

In order to effect the impregnation and incrustation respectively of an imitation parchment paper with artificial resin, one proceeds in this way that the paper which is still in the parchmentizing stage, after it has passed through the acid tanks and the pair of rollers, is led through a bath containing resin-soap solutions. As the already parchmentized paper web is drawn through the resin solution, the excess acid retained in the paper web from the parchmentizing operation, causes a neutralization of the alkali of the resin solution and at the same time the precipitation of the resins and the adherence of same to the gelatinous surface of the paper web. The paper is drawn through the resin solution until the separation of the resins from the resin solution in contact with the paper web is complete. The paper web thus already impregnated or incrusted with artificial resin, is washed for the purpose of washing out the salts which have formed during the preceding chemical process and the excess acid, which is accomplished by the paper web being led through water baths. If it is desired to produce exceptionally heavy parchment paper impregnated or incrusted with artificial resin, two or more webs of raw paper can be introduced into the acid bath and the subsequent resin bath. As they leave the same before entering the water bath, they are allowed to come together to pass together between the pressure rollers, but this can also be done after the water bath.

The hydrolyzed cellulose impregnated or incrusted with artificial resin as well as the dried paper web can be shaped and also can be lamellated, which is done under heat, or under heat and pressure, in that the artificial resin which is still in a fusible state and acts as a binding agent, is thereby converted into its final stage; in other words, it is made insoluble and non-fusible.

I claim:

The process of impregnating or incrustating hydrolyzed fibrous materials which consists in hydrolyzing a fibrous material by a liquid which is effective to produce separation of artificial resin from an alkaline artificial resin solution, and thereafter adding an alkaline artificial resin solution to the hydrolyzed fibrous material whereby the hydrolyzing liquid effects separation of the artificial resin from the resin solution with consequent impregnation of the fibrous material with the resin.

In testimony whereof I affix my signature.

AUGUST REGAL.